United States Patent
Alakuijala et al.

(10) Patent No.: US 9,245,352 B1
(45) Date of Patent: Jan. 26, 2016

(54) SYSTEMS AND METHODS FOR NEAR LOSSLESS IMAGE COMPRESSION

(71) Applicant: Google Inc., Mountain View, CA (US)

(72) Inventors: Jyrki Antero Alakuijala, Zurich (CH); Peter Szabo, Zurich (CH)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 13/861,456

(22) Filed: Apr. 12, 2013

(51) Int. Cl.
*G06T 9/00* (2006.01)

(52) U.S. Cl.
CPC .......................................... *G06T 9/00* (2013.01)

(58) Field of Classification Search
None
See application file for complete search history.

(56) References Cited

U.S. PATENT DOCUMENTS

| | | | |
|---|---|---|---|
| 5,091,782 A | | 2/1992 | Krause et al. |
| 5,333,212 A | | 7/1994 | Ligtenberg |
| 5,486,826 A | * | 1/1996 | Remillard .................... 341/51 |
| 5,610,657 A | | 3/1997 | Zhang |
| 5,625,712 A | | 4/1997 | Schoenzeit et al. |
| 6,167,160 A | * | 12/2000 | Osawa .......................... 382/247 |
| 7,599,840 B2 | | 10/2009 | Mehrotra et al. |
| 7,786,907 B2 | | 8/2010 | Monro |
| 8,160,372 B1 | | 4/2012 | Alakuijala et al. |
| 8,170,112 B2 | | 5/2012 | Ameres et al. |
| 8,175,403 B1 | | 5/2012 | Alakuijala |
| 2004/0086039 A1 | | 5/2004 | Reynolds et al. |
| 2006/0232452 A1 | | 10/2006 | Cha |
| 2012/0265737 A1 | | 10/2012 | Potkonjak |

OTHER PUBLICATIONS

Golchin, Farshid, and Kuldip K. Paliwal. "Minimum-entropy clustering and its application to lossless image coding." Image Processing, 1997. Proceedings., International Conference on. vol. 2. IEEE, 1997.*

Alakuijala, "Specification for WebP Lossless Bitstream", Mar. 22, 2012.

Ke et al., "Near-Lossless Image Compression: Minimum-Entropy, Constrained-Error DPCM", IEEE Transactions on Image Processing, vol. 7, No. 2, Feb. 1998, pp. 225-228.

* cited by examiner

*Primary Examiner* — Utpal Shah
*Assistant Examiner* — Menatoallah Youssef
(74) *Attorney, Agent, or Firm* — Dority & Manning, P.A.

(57) ABSTRACT

Systems and methods for iterative near lossless image compression are provided. An exemplary computer-implemented method of compressing image data can include performing a plurality of compression iterations. Each compression iteration can include at least one decision regarding a loss of image data. The method can also include updating an entropy model following each compression iteration. The entropy model can describe an entropy associated with selected of a plurality of data blocks. The at least one decision regarding the loss of image data can be decided, for each compression iteration, based on the entropy model as updated following the previous compression iteration. Further, a total loss of image data from each data block can remain within an acceptable loss bound associated with the pixel described by such data block. An exemplary system can include a loss determination module, an entropy modeling module, a compression module, and an entropy coding module.

10 Claims, 4 Drawing Sheets

SYSTEMS AND METHODS FOR NEAR LOSSLESS IMAGE COMPRESSION

FIELD

The present disclosure relates generally to image compression. More particularly, the present disclosure relates to systems and methods for iterative near lossless image compression.

BACKGROUND

Image compression refers to techniques for reducing the bit size of digital image files. Reducing the bit size of digital images provides benefits relating to both file storage and file transmission. For example, a web page containing image files can be transmitted across a network and downloaded by an end-user device more quickly if such image files are of reduced file size. Generally, image compression techniques work to compress images by eliminating irrelevant or redundant data and transforming image data to more efficiently convey the image information.

Image compression techniques generally fall within two categories: lossless and lossy. Lossless compression techniques reduce the bit size of a digital image without "losing" any of the information. In other words, lossless compression techniques can be reversed such that the exact original data can be reconstructed from the compressed data. On the other hand, lossy compression techniques compress data by discarding or "losing" some of it. Once the data is discarded, it is generally impossible to return to the exact original.

Thus, lossless compression techniques are generally preferred when it is important that the original and the decompressed data be identical. Typical examples include executable programs, text documents, or, with respect to image compression, medical files or technical drawings. However, because lossless compression techniques are constrained by the requirement that original data be exactly reconstructed, the resulting compression gains are limited.

On the contrary, because lossy techniques are not subject to such constraints, lossy techniques are able to achieve greater magnitudes of compression gains. Thus, lossy techniques are more commonly used when a minimal amount of quality degradation is acceptable and outweighed by the potential benefits associated with reduced bit size. For example, images and other multimedia data, especially in applications such as streaming media, are commonly compressed using lossy techniques.

Near-lossless compression techniques allow some of the original data to be lost. However, the overall loss of data is controlled to remain within a bounded reconstruction error. Therefore, near-lossless compression techniques can represent a compromise between the compression gains of lossy techniques and the quality assurance of lossless techniques.

Thus, improved near-lossless techniques that provide increased compression gains while remaining within a bounded error are desirable.

SUMMARY

Aspects and advantages of the invention will be set forth in part in the following description, or may be obvious from the description, or may be learned through practice of the invention.

One particular aspect of the present disclosure is directed to a computer-implemented method of compressing image data comprising a plurality of symbols respectively stored in a plurality of data blocks. Each symbol can describe one of a plurality of pixels included in an image. The method includes performing a plurality of compression iterations. Each compression iteration can include at least one decision regarding a loss of image data. The method also includes updating an entropy model following each compression iteration. The entropy model can describe an entropy associated with one or more of the plurality of data blocks. The at least one decision regarding the loss of image data is decided, for each compression iteration, based on the entropy model as updated following the previous compression iteration. Further, a total loss of image data from each data block can remain within an acceptable loss bound associated with the pixel described by such data block.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

The present disclosure is generally directed to a method for compressing an image by iteratively performing compression methods to reduce the entropy and bit cost of an image block (i.e. a defined collection of pixels). More particularly, decisions concerning loss within each compression iteration can be made in such a way that the entropy of the image block is reduced while the loss associated with each channel of each pixel remains within an acceptable loss bound associated with such pixel.

Each pixel of an image block can be described by image data capable of being segmented into a plurality of channels.

As an example, each pixel can have four channels respectively corresponding to a transparency (also known as an "alpha"), a red color intensity, a green color intensity, and a blue color intensity. The image data for each pixel can, therefore, comprise four symbols respectively stored in four data blocks, one for each channel. Each symbol can be represented by a binary number and can describe the characteristics of the corresponding channel. For example, referring to FIG. 1, a pixel 106 can be represented by four data blocks respectively storing the following symbols: 92, 100, 80, and 38 (respectively describing the α, R, G, and B channels of pixel 106).

A given collection of symbols can have an entropy. In general, the concept of entropy can refer to an average information content contained within each symbol of the collection of symbols. When the collection of symbols correspond to many various values, entropy is high as it would be difficult to predict a symbol if it was unknown. On the other hand, when the collection of symbols is more concentrated around a few values which are represented frequently (i.e. display a high symbol count), then entropy is lower as an unknown symbol can be predicted with more accuracy.

An entropy model can be created that describes the entropy characteristics of the given collection of symbols. Using such entropy model, the number of bits needed for storing or encoding a particular symbol in a data block can be determined or otherwise predicted.

As an example, an entropy model can describe the entropy characteristics of a given collection of symbols by providing a symbol count for each potential symbol. Such symbol count can indicate the number of instances a potential symbol is particularly represented in the given collection of symbols. For example, in the collection: {5, 4, 5}, the symbol 5 has a symbol count of two.

As a rule, the entropy of a data set generally represents a limit on the amount of compression gains that can be realized. For example, reducing the entropy of a collection of symbols can result in more compact entropy codes and, therefore, increased compression gains if the image is ultimately encoded using an entropy coder. As such, reducing the entropy of a collection of symbols generally correlates to a reduction in the bit cost of such collection of symbols and vice versa.

According to an aspect of the present disclosure, an entropy model can be created for each channel of an image block. As an example, the image data for each pixel of an image block can comprise four symbols respectively corresponding to α, R, G, and B channels of such pixel. Therefore, four entropy models can be created. Each entropy model can describe the entropy characteristics of all symbols of all pixels of the image block that correspond to one of the channels. For example, for all pixels of a given image block, the α-channel entropy model can describe the entropy characteristics of all symbols that describe the α channel of one of such pixels.

According to another aspect of the present disclosure, performances of one or more compression methods to reduce the entropy of image data can be iteratively alternated with revision of the corresponding entropy models. For example, each compression iteration can alter or replace one or more symbols. After such alteration, the entropy model associated with the replaced symbol can be revised based on the altered entropy of all symbols. For example, with reference to FIG. 1, if performance of a compression iteration resulted in a different symbol being stored in data block 138, then the R-channel entropy model can be updated following such compression iteration to reflect the altered entropy characteristics of all R-channel symbols included in image data 104.

In particular, according to another aspect of the present disclosure, each iteration of a compression method can include decisions regarding the loss of data. Specifically, the decision of whether and how much loss should be introduced at a given data block can be based on the entropy model associated with such data block, as revised following the previous compression iteration.

More particularly, for each compression iteration, a plurality raw candidate symbols can determined for each data block. Such raw candidate symbols can be based on the symbol currently stored in such data block, an acceptable loss bound associated with the pixel associated with such data block, and a shift value.

Figure 1:
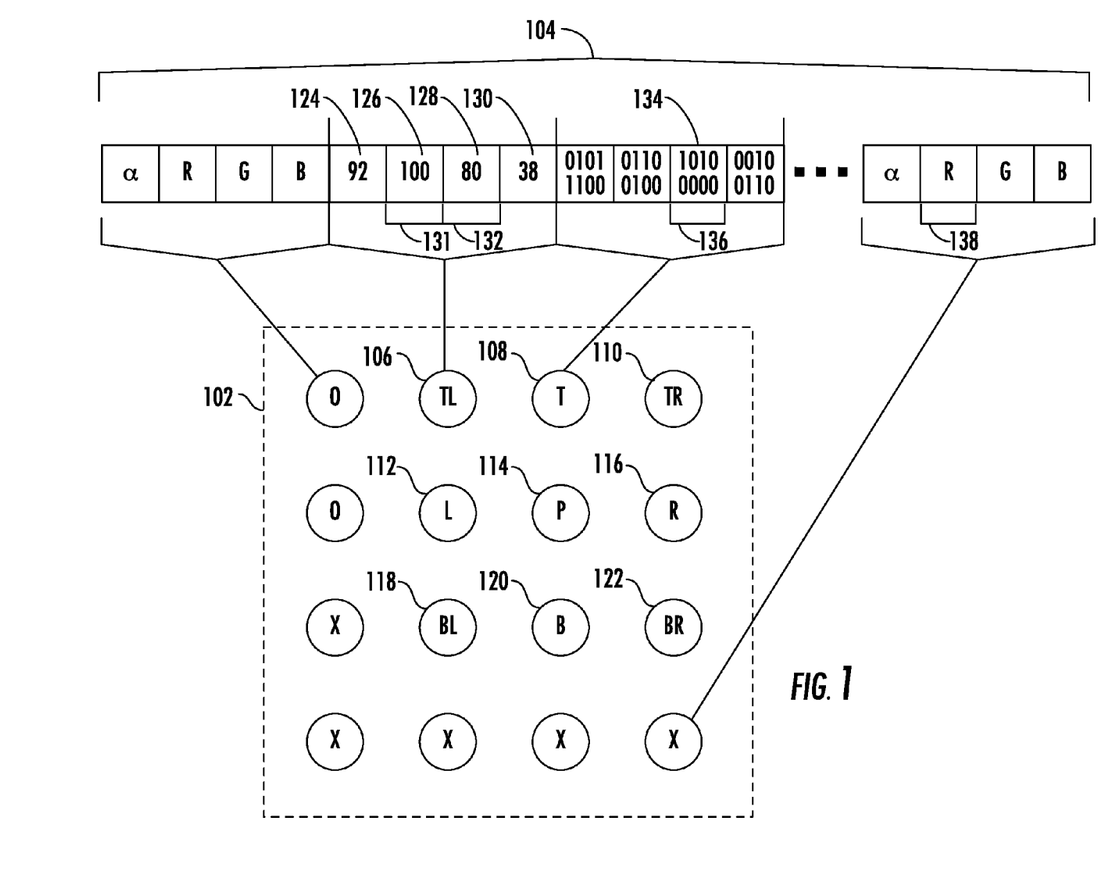
FIG. 1 depicts an exemplary image block and image data according to an exemplary embodiment of the present disclosure.

The acceptable loss bound can define an amount of loss that is acceptable from each data block. For example, if the initial "true" uncompressed symbol in data block 138 is 86, and the acceptable loss bound for such data block is 1, then the ultimately compressed and encoded symbol should be capable of being reconstructed (i.e. decoded) to one of 85, 86, or 87. Thus, the acceptable loss bound can be adjusted in order to determine a balance between reduced bit cost and quality degradation.

The shift value can describe an amount of loss introduced into such data block by the previous iteration. For example, as discussed above, each iteration of a compression method can include a decision of whether and how much loss should be introduced at a given data block. The shift value for each data block can be used to generally track the amount of loss introduced into such data block at the previous iteration, such that such loss can be compensated for in the subsequent iteration. In particular, the shift value allows for the decisions of loss to be made at each iteration while remaining within the acceptable loss bound. In such fashion, the ultimately encoded symbol can be reconstructed a symbol that remains within the acceptable loss bound from the initial uncompressed symbol.

As a simplified example of the above principles, with reference to FIG. 1, if the symbol 126 currently stored in data block 131 describing the red color intensity of pixel 106 is 100, the acceptable loss bound for pixel 106 is 2, and zero loss has previously been introduced (i.e. a shift value of zero), then the range of raw candidate symbols can include 98, 99, 100, 101, and 102.

However, if the shift value is non-zero, then such range of raw candidate values can be shifted. For example, if the shift value for data block 131 is −2, then the range of raw candidate symbols can include 96, 97, 98, 99, and 100. As another example, if the shift value for data block 131 is 1, then the range of raw candidate symbols can include 99, 100, 101, 102, and 103. The magnitude of the shift value should not exceed the magnitude of the acceptable loss bound.

A plurality of compressed candidate symbols can be determined based on the raw candidate symbols. In particular, the compressed candidate symbols can represent the output of the particular compression method being performed at such compression iteration when respectively given the plurality of raw candidate symbols as input.

As an example, if the "subtract green" transform is being performed, then the G-channel symbol 128 is subtracted from the other symbols. Thus, if the plurality of raw candidate symbols for R-channel data block 131 include correspond to 98, 99, 100, 101, and 102, then the compressed candidate symbols for such data block 131 would include 18, 19, 20, 21, and 22.

The compressed candidate symbol that provides the greatest reduction in entropy, according to the most currently revised entropy model associated with the data block under consideration, can be selected and the currently stored symbol can be replaced with the selected compressed candidate symbol.

Further, the shift value associated with the data block under consideration can be updated or revised in order to reflect any introduced loss resulting from the selection from among the compressed candidate symbols. For example, if 18 was selected from a plurality of compressed candidate symbols including 18, 19, 20, 21, and 22, then the shift value can be revised to 2. Therefore, at the subsequent iteration, the range of compressed candidate symbols can be shifted upwards by 2 in order to compensate for the selection of 18 at the previous iteration. Repeating the above method for each data block of each pixel in the image block can comprise one compression iteration.

In one embodiment, the selection among compressed candidate symbols can be performed by predicting, based on the entropy model as revised following the previous iteration, an expected bit cost for each of the compressed candidate symbols. The compressed candidate symbol that is predicted to have the lowest bit cost can be selected and stored in the data block.

After each compression iteration, the entropy models associated with the image block can be recalculated. Thus, subsequent compression iterations can result in different compressed candidate symbols being selected according to the entropy models, as revised following the previous iteration. Because subsequent iterations can further reduce entropy, the ultimate data compression using an entropy coder can result in a reduced bit cost.

However, ultimate loss for each symbol will remain within the acceptable loss bound because the raw candidate symbols are always determined based on the acceptable loss bound and the shift value. In particular, the acceptable loss bound defines the magnitude of acceptable loss while the shift value shifts the range of the plurality of raw candidate symbols to compensate for previously introduced loss.

Further aspects of the present disclosure relate to variations of the above iterative method. For example, the acceptable loss bound associated with each pixel can be calculated in several unique ways. As another example, the entropy models can be updated or recalculated after the transformation of each pixel, rather than after the transformation of all pixels in an image block.

As yet another example, additional entropy models can be introduced in order to perform additional compression techniques that replace strings of repeated symbols with backward references. In addition, image blocks can be combined or clustered so that blocks that exhibit similar entropy characteristics can be represented by a single, shared set of entropy models. In such fashion, the ultimate cost of transmitting a resulting entropy code is reduced.

Exemplary Image Block and Image Data

FIG. 1 depicts an exemplary image block 102 and corresponding image data 104 according to an exemplary embodiment of the present disclosure. Image block 102 includes a plurality of pixels, including pixels 106, 108, 110, 112, 114, 116, 118, 120, and 122. Although image block 102 is depicted in FIG. 1 as a grouping of sixteen pixels in a four by four array, such representation is for the purposes of example only and should not be construed as a limitation. In particular, image block 102 can encompass any suitable grouping of pixels, including, without limitation, all pixels of an image, a generally square block of pixels that represent a subsection of the image, a non-linear grouping of pixels that represent a subsection of the image, or any combination of other image blocks whether adjacent or nonadjacent.

Image block 102 can include pixels capable of being defined by any suitable color space, such as RGB, CMYK, HSV, YUV, RGBα, grayscale, or any other suitable color space, including any combination of such spaces. As an example, as depicted in FIG. 1, each pixel of image block 102 can have four channels respectively corresponding to a transparency (also known as "alpha" or a), a red color intensity, a green color intensity, and a blue color intensity.

Thus, the image data for pixel 106 can include symbols 124, 126, 128, and 130 (respectively describing the α, R, G, and B channels of pixel 106). Each symbol can be stored in a respective data block. For example, symbol 128 can be stored in data block 132. In some implementations, each symbol can be represented in binary format. More particularly, each symbol can be represented as an eight bit byte.

While the terminology "stored in a data block" is used herein, one of skill in the art, in light of the disclosures provided herein, will appreciate that such terminology is used only for the purposes of example and clarity. In particular, the term "data block" does not necessarily refer to any physical hardware or storage method. Instead, the term "data block," as used herein, generally refers to the segmentation of data into discernible, meaningful pieces. For example, image data 104, including symbol 134, can be stored as stream of binary bits according to any known storage method. To say that symbol 134 can be stored in data block 136 generally refers to the ability to conceptually isolate the bits representing symbol 134 from the remainder of the bit stream. Thus, the term "data block," as used herein, refers to a conceptual placeholder and does not limit the present disclosure to a particular form of physical data storage.

According to an aspect of the present disclosure, image data 104 can be compressed by performing a plurality of compression iterations. Each compression iteration can alter or replace one or more of symbols. For example, symbol 126 can be replaced with a replacement symbol based on the performance of a compression method and the replacement symbol can be stored in data block 131.

After each compression iteration, a plurality of entropy models that respectively describe entropy characteristics associated with each data channel of image data 104 can be revised, updated, or otherwise recalculated. As an example, if symbol 126 is replaced with a replacement symbol based on the performance of the compression method, the R-channel entropy model associated with data block 131 can be recomputed or otherwise revised based on the altered entropy of the collection of all R-channel symbols contained in image data 104.

Decisions concerning loss within each compression iteration can be made based upon the entropy models as revised following the previous compression iteration. In such fashion, each compression iteration can use revised entropy models to make decisions regarding loss of data. Specifically, the decision of whether and how much loss should be introduced at a given data block can be based on the entropy model associated with such data block as revised following the previous compression iteration.

As an example, the selection of the replacement symbol to replace symbol 126 can be based on which of a plurality of compressed candidate symbols provides the greatest reduction in entropy according to the current R-channel entropy model. In particular, the current R-channel entropy model can be used to predict an expected bit cost associated with each of the plurality of compressed candidate symbols and the compressed candidate symbol with the smallest expected bit cost can be stored in data block 131 to replace symbol 126.

However, according to another aspect of the disclosure, ultimate loss with respect to each data block can remain within an acceptable loss bound associated with the pixel associated with such data block. For example, if the initial "true" uncompressed symbol in data block 138 is 86, and the acceptable loss bound for such data block is 1, then the ultimately compressed symbol should be capable of being reconstructed (i.e. decoded) to one of 85, 86, or 87. In such fashion, the compression gains associated with multiple compression iterations are achieved while loss remains within a bounded error.

Exemplary System for Iterative Near Lossless Compression

Figure 2:
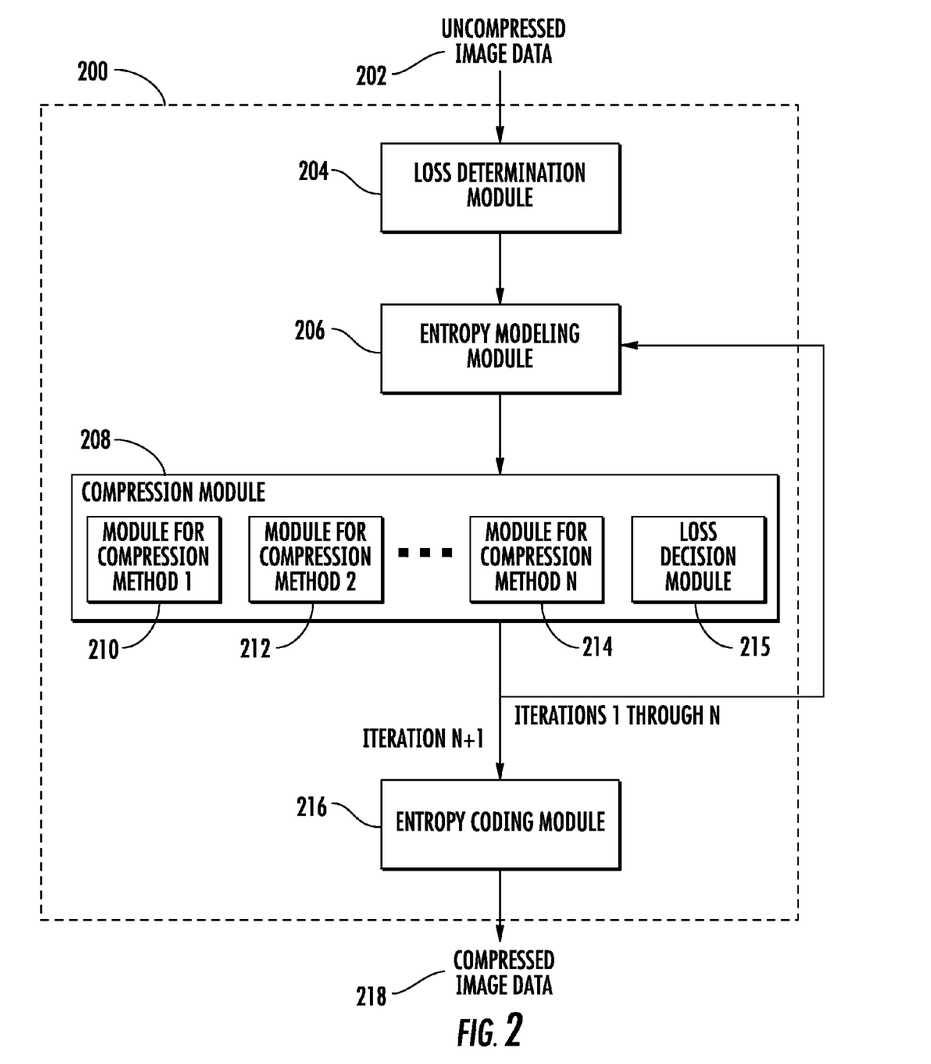
FIG. 2 depicts an exemplary system for iteratively compressing image data according to an exemplary embodiment of the present disclosure.

FIG. 2 depicts an exemplary system 200 for iteratively compressing image data according to an exemplary embodiment of the present disclosure. In accordance with aspects of the present disclosure, system 200 can iteratively compress and entropy encode uncompressed image data 202 to create compressed image data 218. In particular, system 200 can alternate between compression iterations and updating a plurality of entropy models in order to achieve increased compression gains while remaining within an acceptable loss bound for the image data.

System 200 can include a loss determination module 204, an entropy modeling module 206, a compression module 208, and an entropy coding module 216. It will be appreciated that the term "module" refers to computer logic utilized to provide desired functionality. Thus, a module can be implemented in hardware, firmware and/or software controlling a general purpose processor. In one embodiment, the modules are program code files stored on a storage device, loaded into memory and executed by a processor or can be provided from computer program products, for example, computer executable instructions that are stored in a tangible computer-readable storage medium such as RAM hard disk or optical or magnetic media.

Uncompressed image data 202 can be provided in any format, including the format depicted for image data 104 of FIG. 1. Uncompressed image data 202 can include two or more subsections or partitions. In one implementation, uncompressed image data is partitioned or otherwise discretized into a plurality of image blocks. Such image blocks can each be a sixteen by sixteen array of pixels.

Loss determination module 204 can determine an acceptable loss bound for each data block included in uncompressed image data 202. The acceptable loss bound can define the amount of loss that is acceptable for such data block and can be measured with respect to the initial symbol stored in such data block. For example, the initial symbol can be the symbol stored in such data block in uncompressed image data 202.

One or more data blocks can share the same acceptable loss bound. For example, in one implementation, the acceptable loss bound is the same for all data blocks included within uncompressed image data 202. In another implementation, loss determination module 204 determines acceptable loss bounds on an image block by image block basis such that all data blocks included within an image block share the same acceptable loss bound. In yet another implementation, loss determination module 204 determines acceptable loss bounds on a pixel by pixel basis such that all data blocks associated with a pixel share the same acceptable loss bound.

In another implementation, loss determination module 204 determines acceptable loss bounds on a data block by data block basis.

Loss determination module 204 can operate in a number of fashions. In one implementation, loss determination module 204 operates by requesting, receiving, or otherwise obtaining user input. For example, the user input can directly provide a single acceptable loss bound for the entire image. As another example, the user input can define a plurality of acceptable loss bounds respectively assigned to a plurality of image blocks. In general, loss determination module 204 can receive user input indicating a desired balance between compression gains and reduced image quality. For instance, a user can indicate such desired balance by indicating a position on a sliding scale.

In another implementation, loss determination module 204 can operate to determine an acceptable loss bound for each data block without receiving user input. For example, loss determination module 204 can operate according to an algorithm such that greater acceptable loss bounds are determined for pixels in an image section displaying a larger degree of noise while smaller acceptable loss bounds are determined for pixels in an image section displaying less amounts of noise.

As an example, with reference to FIG. 1, pixel 114 is surrounded by neighboring pixels, including top pixel 108, left pixel 112, right pixel 116, and bottom pixel 120. Loss determination module 204 can determine an acceptable loss bound for pixel 114 by differencing each initial symbol stored in each data block associated with pixel 114 with a corresponding symbol stored in a corresponding data block associated with each of neighboring pixels 108, 112, 116, and 120.

For example, in the instance in which pixel 114 is defined by four symbols respectively related to four channels, such as a pixel defined in the RGBα color space, the initial "R" symbol for pixel 114 can be differenced with the initial "R" symbol from each of neighboring pixels 108, 112, 116, and 120. Likewise, the initial "G" symbol for pixel 114 can be differenced with the initial "G" symbol from each of pixels 108, 112, 116, and 120. Performing for each channel provides four difference values for each channel and a total of sixteen difference values when the pixel is defined by four channels. Loss determination module 204 can select as the acceptable loss bound for pixel 114 the difference value of greatest magnitude from all sixteen difference values.

As another example, loss determination module 204 can also perform the above method with respect to all neighboring pixels, including top-left pixel 106, top pixel 108, top-right pixel 110, left pixel 112, right pixel 116, bottom-left pixel 118, bottom pixel 120, and bottom-right pixel 122, such that eight difference values are computed for each channel of pixel 114 instead of four.

As yet another example, loss determination module 204 can perform the above method for only the RGB channels of an image defined in the RGBα color space, such that transparency does not have an effect of the acceptable loss bounds. As another example, loss determination module 204 can determine acceptable loss bounds on a data block by data block basis (i.e. a channel by channel basis). For example, the acceptable loss bound for the "G" data block of pixel 114 can be the difference value of greatest magnitude from all difference values formed with respect to the "G" symbols of neighboring pixels.

Returning to FIG. 2, Entropy modeling module 206 can create, revise, or otherwise recalculate a entropy model for a given collection of symbols. The entropy model can describe an entropy associated with the given collection of symbols.

As an example, entropy modeling module 206 can create or revise a histogram describing a plurality of symbol counts respectively associated with a plurality of potential symbols. Such histogram need not take a graphical, visual, or human-readable form. Instead, such histogram can be purely numerical in nature or can be generated or stored solely in computer-readable code. As another example, entropy modeling module 206 can create a probability distribution or probability distribution function describing the entropy of a given collection of symbols. In some implementations, potential symbols with a symbol count of zero can be ballasted or discarded.

Entropy modeling module 206 can create and revise one or more entropy models for one or more image blocks of a given image. In one implementation, uncompressed image data 202 can comprise a plurality of image blocks each consisting of a sixteen by sixteen array of pixels and entropy modeling module 206 can determine or create one or more entropy models for each image block. For example, if uncompressed image data 202 is defined in the RGBα color space, then entropy modeling module 206 can create and revise four entropy models for each image block of image data 202.

As another example, entropy modeling module 206 can further create and revise additional entropy models for each image block so that additional compression methods can be performed with respect to such image block. For example, additional entropy models can be introduced in order to perform additional compression techniques that replace strings of repeated symbols with backward references rather than simply transform or replace a single symbol at a time. Thus, compression techniques that operate on a data block by data block basis can be performed with reference to the channel-based entropy models while compression techniques that replace strings of symbols with backward references can be performed with reference to one or more additional backward reference entropy models.

Entropy modeling module 206 can further create one or more entropy clusters. For example, an entropy cluster can include two or more image blocks combined together and a single, shared set of entropy models can respectively describe the entropy of all symbols included in the entropy cluster. In such fashion, the ultimate cost of transmitting an entropy code used to decode the compressed image data can be reduced.

For example, entropy modeling module 206 can create one or more entropy clusters by combining or otherwise departitioning two or more image blocks that exhibit similar entropy characteristics. In one implementation, entropy modeling module repeatedly joins two or more randomly selected image blocks and calculates the resulting change in expected bit cost. When creation of the entropy cluster results in an expected reduction in bit cost, the two or more image blocks are combined to create the entropy cluster. Such entropy clusters can be further combined with other clusters or image blocks if desirable.

Compression module 208 can perform one or more compression methods with respect to uncompressed image data 202. For example, as depicted in FIG. 2, compression module 208 can include modules that provide capability to perform multiple different compression methods, including modules 210, 212, and 214.

Exemplary compression methods that can be implemented by modules 210, 212, and 214 include, without limitation, one or more predictor transforms, a color transform, a subtract green transform, a color indexing transform, LZ77 prefix coding, LZ77 backward reference coding, LZ77 distance mapping, color cache coding, and Huffman coding. Such transforms are discussed and disclosed in "Alakuijala, J., *Specification for WebP Lossless Bitstream*, Google, Inc. dated 2012 Mar. 22" which is hereby incorporated by reference in its entirety and is authored by a named inventor of the present subject matter. In addition, compression modules 210, 212, and 214 can perform any suitable compression methods not expressly discussed herein, including a custom or adaptive weighted linear predictor method, color palettization, a Paeth prediction mode, arithmetic coding, PNG coding, GIF coding, or other suitable compression methods.

Compression module 208 can also implement aspects of the present disclosure. For example, a loss decision module 215 can operate in concert with one or more of modules 210, 212, and 214, to implement aspects of the particular disclosure. In particular, loss decision module 215 can make decisions regarding whether and how much loss should be introduced at a given data block within each compression method. Specifically, loss decision module 215 can make such decisions concerning loss based upon the entropy models as revised following the previous compression iteration by entropy modeling module 206 and the acceptable loss bounds determined for each data block by loss determination module 204.

Thus, as depicted in FIG. 2, system 200 can perform a plurality of iterations in which compression module 208 performs a compression method, entropy modeling module 206 updates or revises the entropy models to reflect the altered entropy, and compression module 208 performs the same or a different compression method based on the revised entropy models. In such fashion, each compression iteration can use revised entropy models to make decisions regarding loss of data.

Specifically, the decision of whether and how much loss should be introduced at a given data block can be based on the entropy models as revised following the previous compression iteration. However, loss decision module 215 always makes decisions regarding loss such that the ultimate loss of image data from each data block remains with the acceptable loss bounds determined by loss determination module 204.

Multiple compression iterations can reduce the entropy and bit cost of the image data at each iteration. The number of compression iterations performed is a design choice in various embodiments. For example, if a computing system performing the present method has sufficient computing power and CPU time consumption is a less important performance factor, the number of compression iterations to minimize entropy can be arbitrarily large. In other scenarios when computation power is limited, a smaller number of compression iterations can be performed to balance the tradeoff between compression efficiency and compression quality.

System 200 can include an iteration control module (not pictured) to control the number of compression iterations needed for optimized compression performance. For example, the iteration control module can include an iteration counter that counts up to an iteration limit or counts down to zero from an initial iteration number. Generally, however, the number of iterations can be modified by a user in order to achieve an appropriate balance of compression goals.

After sufficient compression iterations have been performed, entropy coding module 216 can encode the resulting image data according to an entropy encoding method. Non-limiting examples of encoding methods include Huffman coding, arithmetic coding, universal coding such as Elias gamma coding or Fibonacci coding, Golomb coding such as unary coding or Rice coding, or other suitable forms of entropy encoding. System 200 can output the entropy coded image data as compressed image data 218. Compressed image data 218 can be stored in non-transitory computer-readable media or can be transmitted according to any known storage or transmission techniques.

Exemplary Method for Near Lossless Image Compression

Figure 3A:
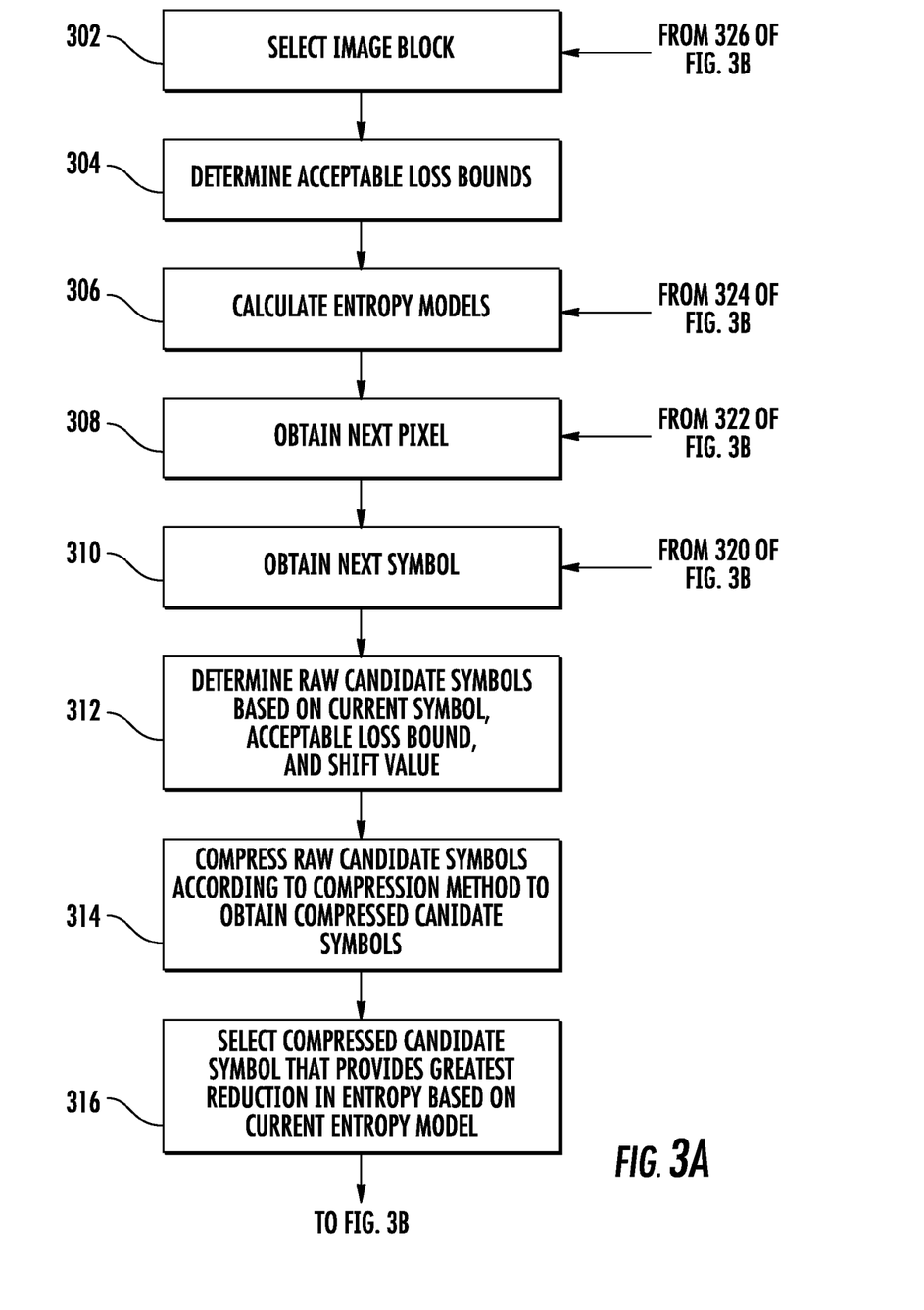
FIGS. 3A and 3B depict a flowchart of an exemplary method for compressing image data according to an exemplary embodiment of the present disclosure.
Figure 3B:
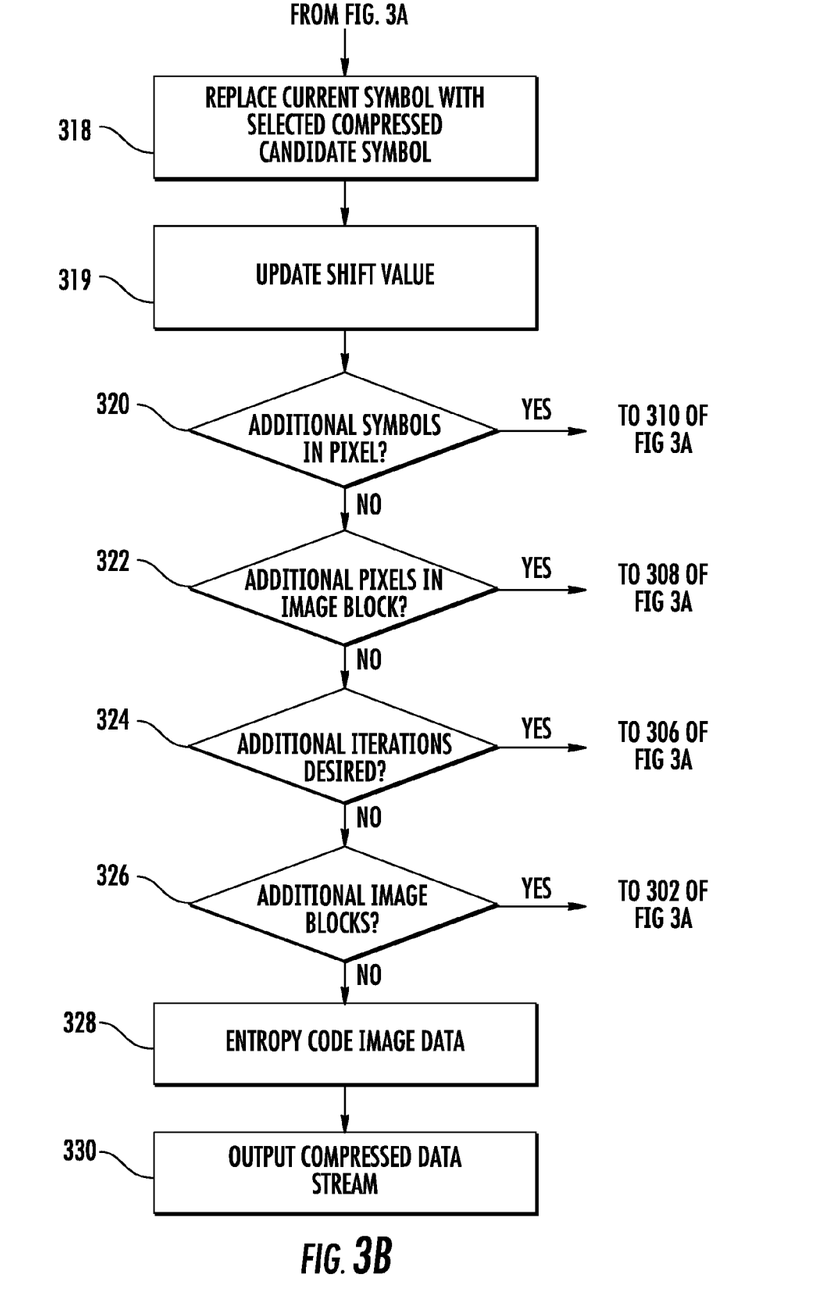

FIGS. 3A and 3B depict a flowchart of an exemplary method (300) for compressing image data according to an exemplary embodiment of the present disclosure. Although exemplary method (300) will be discussed with reference to exemplary system 200, exemplary method (300) can be implemented using any suitable computing system. In addition, although FIGS. 3A and 3B depict steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

Referring to FIG. 3A, at (302) an image block is selected. For example, uncompressed image data 202 can include a plurality of image blocks. Generally, method (300) is performed on one image block at a time. At (302) an image block is selected or otherwise provided to the system performing method (300) such that the data associated with the image block can be compressed.

In one implementation, uncompressed image data 202 can be partitioned into a plurality of image blocks corresponding to sixteen by sixteen pixel arrays. Further, two or more image blocks can be combined to form an entropy cluster if they display similar entropy characteristics. In such instance, the entropy cluster can be selected or otherwise obtained at (302).

At (304) acceptable loss bounds are determined for each data block of the image block. For example, loss determination module 204 can operate to determine an acceptable loss bound for each data block. In one implementation, user input is provided at (304) in order to determine or guide the acceptable loss bounds.

In another implementation, acceptable loss bounds are determined at (304) according to an algorithm. For example, acceptable loss bounds can be greater for pixels in an area of the image exhibiting higher noise while smaller for pixels in an area of the image exhibiting less noise. As an example, acceptable loss bounds can be determined on a pixel by pixel basis by comparing the initial symbol for each channel of such pixel with four or eight of the corresponding symbols of neighbor pixels. In particular, the greatest difference between a symbol of the pixel under evaluation and a corresponding symbol of a neighbor pixel can be used as the acceptable loss bound for the entire pixel.

While the exemplary algorithm discussed above determined acceptable loss bounds on a pixel by pixel basis, one of skill in the art, in light of the disclosures contained herein, will appreciate that acceptable loss bounds can be determined at (304) on a data block by data block basis or any other suitable grouping of symbols.

At (306) one or more entropy models are calculated for the image block selected at (302). For example, if uncompressed image data 202 is defined in the RGBα color space, then entropy modeling module 206 can create and revise four entropy models, respectively corresponding to the α, R, G, and B channels. For example, the R-channel entropy model can describe the entropy associated with all R-channel symbols included in the image block selected at (302).

In one implementation, each entropy model can be a computer-readable histogram describing one or more symbol counts with respect to all potential symbols. Generally, however, such entropy models can be used to predict a bit cost associated with storing a particular symbol. Thus, the entropy models can be used to select which of a plurality of compressed candidate symbols results in the greatest reduction in entropy or is associated with the smallest bit cost.

At (308) the next pixel is obtained. For example, image data, such as one or more symbols, for the first pixel can be read from the bit stream. As an example, in the instance in which uncompressed image data 202 is defined in the RGBα color space and symbols are stored in 8-bit data blocks, the next pixel can be obtained at (308) by reading the next 32 bits of uncompressed image data 202.

At (310) the next symbol is obtained or otherwise isolated from the remainder of the pixel data. Generally, step (310) can signify that method (300) has isolated the next symbol as a data block as is performing a compression method with respect to such symbol. In one implementation, method (300) simply obtains at (310) the next symbol in the data stream, for example, as depicted in FIG. 1. However, one of skill in the art will appreciate that, for some compression methods, method (300) can operate to compress symbols within a pixel in an order that is not directly consistent with data stream ordering.

As an example, when performing the subtract green transform, the G-channel symbol for each pixel should be obtained and considered first, such that any decision regarding loss with respect to such G-channel symbol properly cascades with respect to the other symbols included in the pixel. As another example, certain compression methods can require that the α-channel symbol not be compressed with respect to any symbols associated with other pixels, the G-channel symbol can be compressed with respect to only the pixel to the left, the R-channel symbol can be compressed with respect to only the G-channel symbol, and the B-channel symbol can be compressed with respect to only the R-channel symbol or the G-channel symbol. When performing such compression method, therefore, method (300) can obtain symbols in the order G, R, B, α.

At (312) a plurality of raw candidate symbols are determined for the data block associated with the symbol obtained at (310). Such raw candidate symbols can be determined based on the symbol currently stored in the data block, the acceptable loss bound associated with such data block, and the current shift value associated with such data block. As an example, the plurality of raw candidate symbols can be determined by forming a range of raw candidate symbols around the currently stored symbol based on the acceptable loss bound. Such range of raw candidate symbols can then be shifted in accordance with the shift value. However, one of skill in the art will appreciate that method (300) can use any suitable combination of operations to determine the plurality of raw candidate symbols based on the symbol currently stored in the data block, the acceptable loss bound associated with such data block, and the current shift value associated with such data block.

As an example, with reference to FIG. 1, if the symbol 126 currently stored in data block 131 describing the red color intensity of pixel 106 is 100, the acceptable loss bound for pixel 106 is 2, and zero loss has previously been introduced (i.e. a shift value of zero), then the range of raw candidate symbols determined at (312) can include 98, 99, 100, 101, and 102.

However, if the shift value is non-zero, then such range of raw candidate values can be shifted. For example, if the shift value for data block 131 is −2, then the range of raw candidate symbols determined at (312) can include 96, 97, 98, 99, and 100. As another example, if the shift value for data block 131 is 1, then the range of raw candidate symbols determined at (312) can include 99, 100, 101, 102, and 103. The magnitude of the shift value should not exceed the magnitude of the acceptable loss bound.

At (314) the plurality of raw candidate symbols determined at (312) are compressed according to the compression method currently being performed such that a plurality of compressed candidate symbols are obtained. In particular, the compressed candidate symbols obtained at (314) can represent the output of the particular compression method being performed at that iteration when respectively given the raw candidate symbols determined at (312) as input.

As an example, if the subtract green transform is being performed, then the G-channel symbol is subtracted from the other symbols associated with the pixel obtained at (308). In particular, with reference to FIG. 1, to perform the subtract green transformation for data block 131, the symbol stored in data block 132 would be subtracted from the symbol stored in data block 131 and the residual would then be stored in data block 131. Thus, to continue the example provided above, the plurality of raw candidate symbols determined at (312) (e.g. 98, 99, 100, 101, and 102) can be compressed at (314) in order to obtain a plurality of compressed candidate symbols (18, 19, 20, 21, and 22).

One of skill in the art will appreciate that the order in which various steps of exemplary method (300) are performed can be altered or that such steps can be combined or modified in various fashions and still remain within the scope of the present disclosure. For example, for certain compression methods the determination of candidate symbols can occur following compression rather than before. For example, the currently stored symbol can be compressed according to the appropriate compression method and, following such compression, the plurality of compressed candidate symbols can be determined based on the acceptable loss bound and the shift value.

At (316) the compressed candidate symbol that provides the greatest reduction in entropy, according to the corresponding entropy model calculated at (306), is selected and stored in the corresponding data block. For example, the determination with respect to which of the compressed candidate symbols is selected and stored in data block 131 can be based on the R-channel entropy model as most recently calculated at (306).

Thus, loss decision module 215 can operate to select the compressed candidate symbol that provides the greatest reduction in entropy according to the current entropy model. As an example, in the instance in which the entropy model calculated at (306) comprises a histogram including a plurality of symbol counts, loss decision module 215 can select the compressed candidate symbol that corresponds with the symbol count of greatest magnitude. As another example, loss decision module 215 can predict, based on the appropriate entropy model, an expected bit cost associated with each of the compressed candidate symbols obtained at (314). The compressed candidate symbol associated with the predicted bit cost of smallest magnitude can be selected at (316).

Referring now to FIG. 3B, at (318) the symbol currently stored in the data block under consideration is replaced with the compressed candidate symbol selected at (316). For example, to continue the example provided above, if loss decision module 215 determines at (316) that 18 is the compressed candidate symbol that provides the greatest reduction in entropy, according to the current entropy model, then 18 can be stored in data block 131 or otherwise replace the current symbol 100.

At (319) the shift value associated with the data block can be updated, revised, or replaced based on the selection performed at (316). As an example, if the symbol 18 was selected from a plurality of compressed candidate symbols including 18, 19, 20, 21, and 22 at (316), then the shift value could be updated to 2. Thus, in the subsequent iteration, the range of raw candidate values would be shifted upwards by 2 in order to compensate for the selection of 18 in the previous iteration. Generally, such updated shift value should reflect any loss introduced by the selection performed at (316).

At (320) it is determined whether additional symbols are in the pixel obtained at (308). If yes, then method (300) returns to step (310) of FIG. 3A and obtains the next symbol in the pixel. In such fashion, steps (312)-(319) are performed for each symbol associated with the pixel obtained at (308).

If it is determined at (320) that all symbols of the pixel have been compressed in accordance with steps (312)-(319), then method (300) proceeds to (322).

At (322) it is determined whether additional pixels are in the image block selected at (302). If yes, then method (300) returns to step (308) of FIG. 3A and obtains the next pixel in the image block. In such fashion, steps (310)-(320) are performed for each pixel in the image block selected at (302).

If it is determined at (322) that all pixels in the image block have been compressed in accordance with steps (310)-(320), then method (300) proceeds to (324).

At (324) it is determined whether additional iterations are desired. If yes, then the method returns to step (306) of FIG. 3A and recalculates, revises, or otherwise updates the entropy models. In particular, each entropy model is revised to reflect the altered entropy associated with the collection of symbols described by such entropy model.

Thus, subsequent iterations of steps (306)-(322) can result in loss decision module 215 selecting compressed candidate symbols according to the entropy models, as revised at (306). Because subsequent iterations can further reduce entropy, the ultimate data compression using an entropy coder can result in a reduced bit cost. However, ultimate loss for each data block will remain within the acceptable loss bound because the compressed candidate symbols are always determined based on the acceptable loss bound and the shift value. In addition, the same or different compression method can be performed at each iteration of steps (306)-(322).

If it is determined at (324) that additional iterations are not desired, then method (300) proceeds to (326). At (326) it is determined whether there are additional image blocks contained within the image being compressed. If yes, then method (300) returns to (302) and selects the next image block. In such fashion, all image blocks of the image can be iteratively compressed according to the present subject matter. In addition, although not expressly depicted in FIGS. 3A and 3B, two or more image blocks can be combined to form an entropy cluster prior to any of such iterations.

If it is determined at (326) that all image blocks of the image have been satisfactorily compressed, then at (328) the image data is entropy encoded. For example, entropy coding module 216 can entropy encode the image data. Once entropy encoded, the image data can be output as a compressed data stream at (330). For example, the compressed data stream output at (330) can correspond to compressed image data 218 of FIG. 2. The compressed data stream can be stored in a non-transitory computer readable medium or can be transmitted according to any known storage or transmission techniques.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method comprising:
    determining a plurality of acceptable loss bounds, each acceptable loss bound being associated with one of a plurality of pixels included in an image;
    performing, using one or more computing devices, a plurality of compression iterations, each compression iteration including at least one decision regarding a loss of image data, the image data comprising a plurality of symbols respectively stored in a plurality of data blocks, each symbol describing one of the plurality of pixels included in the image; and
    updating, using the one or more computing devices, an entropy model following each compression iteration, the entropy model describing an entropy associated with one or more of the plurality of data blocks, wherein the updated entropy model reflects altered entropy characteristics of one or more symbols in the image data;
    wherein the at least one decision regarding the loss of image data is decided, for each compression iteration, based on the entropy model as updated following the previous compression iteration; and
    wherein a total loss of image data from each data block remains within each of the plurality of acceptable loss bounds respectively associated with each pixel included in the image.

2. The computer-implemented method of claim 1, further comprising generating the entropy model prior to performing the plurality of compression iterations.

3. The computer-implemented method of claim 2, wherein the entropy model comprises a histogram describing a plurality of symbol counts.

4. The computer-implemented method of claim 1, wherein determining a plurality of acceptable loss bounds comprises receiving at least one acceptable loss bound input by a user.

5. The computer-implemented method of claim 1, wherein the acceptable loss bound associated with each pixel is proportional to a noise factor associated with such pixel, the noise factor describing a similarity between such pixel and at least one neighbor pixel.

6. The computer-implemented method of claim 1, wherein determining a plurality of acceptable loss bounds comprises computing the acceptable loss bound for each pixel by performing operations comprising:
    differencing, for each data block associated with the pixel, an initial symbol initially stored by such data block with a corresponding symbol stored by a corresponding data block associated with each of the following pixels, such that four difference values are generated for each data block associated with the pixel:
        a top pixel located, in the image, above the pixel;
        a left pixel located, in the image, to the left of the pixel;
        a bottom pixel located, in the image, below the pixel; and
        a right pixel located, in the image, to the right of the pixel; and
    selecting, from all difference values generated with respect to all data blocks associated with the pixel, the difference value of greatest magnitude as the acceptable loss bound for the pixel.

7. The computer-implemented method of claim 1, wherein the at least one decision regarding the loss of image data comprises selecting, for at least one data block, a replacement symbol from a plurality of compressed candidate symbols, each compressed candidate symbol corresponding to a raw candidate symbol that is within the acceptable loss bound associated with the at least one data block.

8. The computer-implemented method of claim 1, wherein the image data is partitioned into a plurality of image blocks and the computer-implemented method further comprises, prior to at least one compression iteration, forming an entropy cluster of two or more image blocks such that the entropy model describes an entropy associated with data blocks from each of the image blocks forming the entropy cluster.

9. The computer-implemented method of claim 1, wherein the image data is partitioned into a plurality of image blocks and the computer-implemented method further comprises, prior to at least one compression iteration:
    randomly selecting two or more image blocks;
    computing a first bit cost associated with individually entropy coding each of the two or more image blocks;
    computing a second bit cost associated with entropy coding an entropy cluster, the entropy cluster comprising the two or more image blocks combined with each other; and
    departitioning the two or more image blocks to form the entropy cluster when the second bit cost is less than the first bit cost, such that the entropy model describes an entropy associated with data blocks from each of the image blocks combined to form the entropy cluster.

10. The computer-implemented method of claim 1, further comprising encoding the image data using an entropy coder after performing the plurality of compression iterations.

* * * * *